(12) United States Patent
Davis et al.

(10) Patent No.: US 11,519,776 B2
(45) Date of Patent: Dec. 6, 2022

(54) SYSTEM AND METHOD FOR DETERMINING AXLE LOAD

(71) Applicant: Dana Heavy Vehicle Systems Group, LLC, Maumee, OH (US)

(72) Inventors: Mark A. Davis, Kalamazoo, MI (US); Anthony N. Passero, Holland, OH (US); Stoyan I. Stoychev, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 241 days.

(21) Appl. No.: 16/887,767

(22) Filed: May 29, 2020

(65) Prior Publication Data

US 2020/0393287 A1   Dec. 17, 2020

Related U.S. Application Data

(60) Provisional application No. 62/860,982, filed on Jun. 13, 2019.

(51) Int. Cl.
| | |
|---|---|
| *G01G 19/08* | (2006.01) |
| *B62D 7/18* | (2006.01) |
| *G01G 19/02* | (2006.01) |
| *G01G 19/18* | (2006.01) |
| *G01G 19/40* | (2006.01) |

(52) U.S. Cl.
CPC ............ *G01G 19/086* (2013.01); *B62D 7/18* (2013.01); *G01G 19/028* (2013.01); *G01G 19/18* (2013.01); *G01G 19/40* (2013.01)

(58) Field of Classification Search
CPC ...... B62D 15/023; B62D 7/18; G01G 19/028; G01G 19/08; G01G 19/086; G01G 19/18; G01G 19/40
See application file for complete search history.

(56) References Cited

U.S. PATENT DOCUMENTS

| | | | |
|---|---|---|---|
| 4,691,792 A * | 9/1987 | Shintani | G01G 19/10 177/208 |
| 4,756,374 A | 7/1988 | Bailey et al. | |
| 5,215,154 A | 6/1993 | Kirby | |
| 5,877,455 A | 3/1999 | Kyrtsos | |
| 5,995,888 A | 11/1999 | Hagenbuch | |
| 6,283,483 B1 | 9/2001 | Johnson et al. | |
| 6,874,376 B2 | 4/2005 | Mattmann | |
| 7,472,002 B2 | 12/2008 | McCann | |
| 7,926,362 B2 * | 4/2011 | Andersson | G01M 17/10 73/862.041 |
| 8,818,699 B2 | 8/2014 | Nichols et al. | |
| 2013/0119628 A1 * | 5/2013 | Deierling | B62D 7/18 280/93.512 |
| 2013/0297154 A1 * | 11/2013 | Burchett | B62D 53/0814 280/438.1 |

(Continued)

FOREIGN PATENT DOCUMENTS

BR   102013003049 A2 *  4/2014  ............. G01G 19/08

*Primary Examiner* — Natalie Huls
(74) *Attorney, Agent, or Firm* — McCoy Russell LLP

(57) ABSTRACT

Methods and systems for estimating an axle load of a vehicle are described. In one example, a method is disclosed wherein axle load is estimated in response to an angle between two components of an axle. The angle may change as weight is added to or removed from the axle such that axle load may be determined as a function of the angle.

16 Claims, 7 Drawing Sheets

(56) References Cited

U.S. PATENT DOCUMENTS

2017/0013783 A1\* 1/2017 Kirk ................. G01G 17/00
2018/0057051 A1\* 3/2018 Passero ............. B62D 15/023
2019/0343052 A1\* 11/2019 Derscheid .......... G01G 17/00

\* cited by examiner

SYSTEM AND METHOD FOR DETERMINING AXLE LOAD

CROSS-REFERENCE TO RELATED APPLICATIONS

The present application claims priority to U.S. Provisional Application No. 62/860,982, entitled "SYSTEM AND METHOD FOR DETERMINING AXLE LOAD", and filed on Jun. 13, 2019. The entire contents of the above-listed application are hereby incorporated by reference for all purposes.

TECHNICAL FIELD

The present disclosure relates to a system and method for determining the axle load of a vehicle by measuring the toe angle of each wheel of the axle.

BACKGROUND AND SUMMARY

The axle load of a vehicle is the total amount of weight transferred by an axle and its wheels to a road. The axle load of a vehicle may increase when weight is added to the vehicle and it may be decrease when weight is removed from the vehicle. The vehicle's total weight may influence a distance that it takes for the vehicle to come to a stop and the vehicle's stability. As such, it may be desirable to determine a vehicle's axle load. One way to determine a vehicle's axle load is to install one or more strain gauges on an axle or vehicle suspension component. However, strain gauges may have a tendency to separate from the vehicle when they are exposed to environmental conditions (e.g., salt, water, temperature, and dirt) and vehicle conditions (e.g., vibrations). Therefore, it may be desirable to provide a way of determining an axle load without use of a strain gauge.

The inventors herein have recognized the above-mentioned issues and have developed a method for estimating axle load of a vehicle, comprising: estimating axle load of a vehicle in response to one or more angles between two or more axle system components via a controller; and adjusting operation of a system of the vehicle in response to the estimated axle load of the vehicle.

By measuring an angle between two components of an axle system, it may be possible to estimate a load that is applied to the axle system. In particular, an axle system may include several components that form a trapezoid. In one example, the axle system may include an axle and a tie rod that form parallel sides of a trapezoid. The axle system may also include two knuckles that form the remaining sides of the trapezoid. The axle's shape may change when a heavy load is applied to the axle while the tie rod's length remains unchanged since the load that is applied to the axle is not applied to the tie rod. An angle between the axle and a knuckle may change as load is applied and removed from the axle. The angle may be indicative of the load that is applied to the axle. Therefore, an estimate of a load applied to the axle may be estimated from the angle that is between the two axle system components. Measuring the angle between the two axle system components may be more reliable than measuring axle load via a strain gauge because the axle system is free to expand and contract without the angle sensor separating from the axle system.

The present description may provide several advantages. In particular, the approach may provide axle load sensing in the presence of axle system expansion and contraction that may be due to ambient temperature. In addition, the approach may provide increased sensor reliability since the angle sensor may be exposed to a less severe environment than strain gauges. Further, the approach may communicate the estimated axle load to other vehicle systems to improve vehicle operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
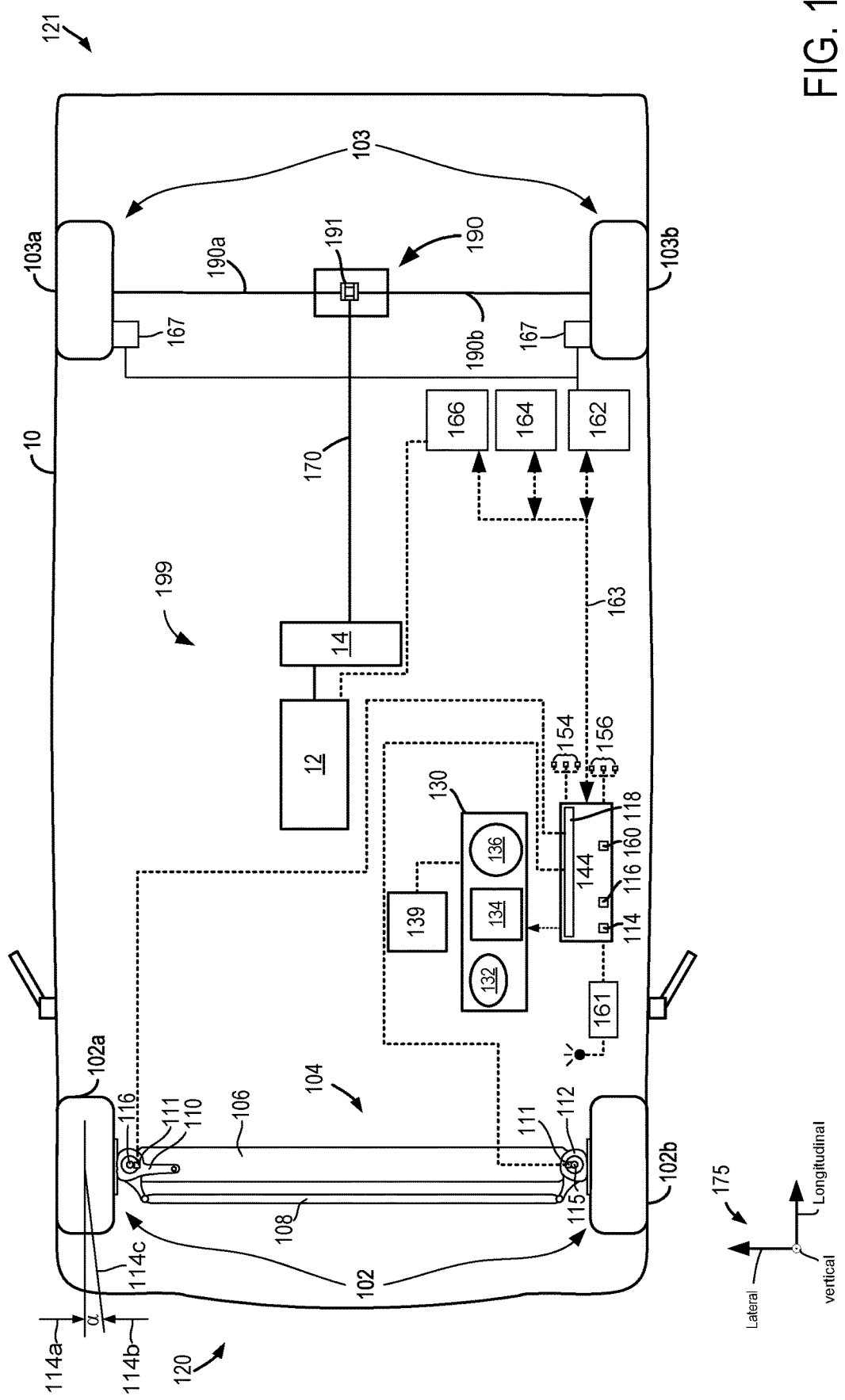
FIG. 1 is a schematic diagram of a driveline assembly and axles is shown.
Figure 3:
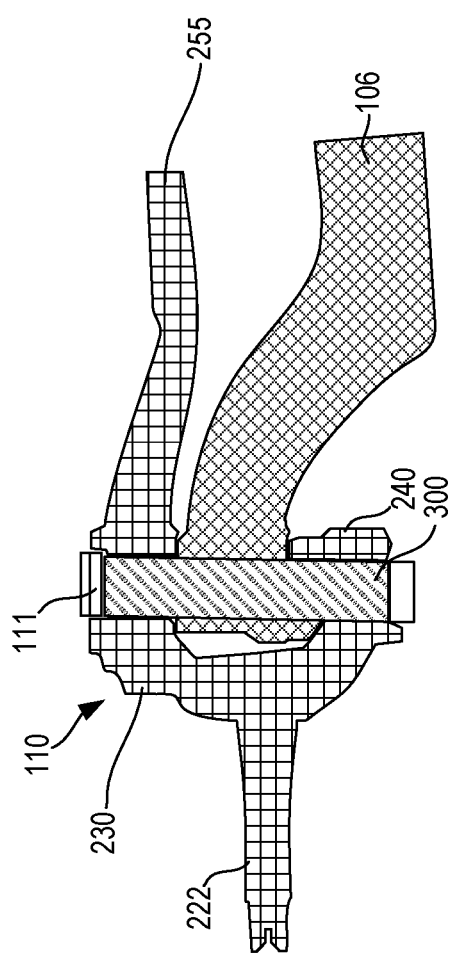
FIG. 3 shows a cross section of a portion of the axle assembly.
Figure 4:
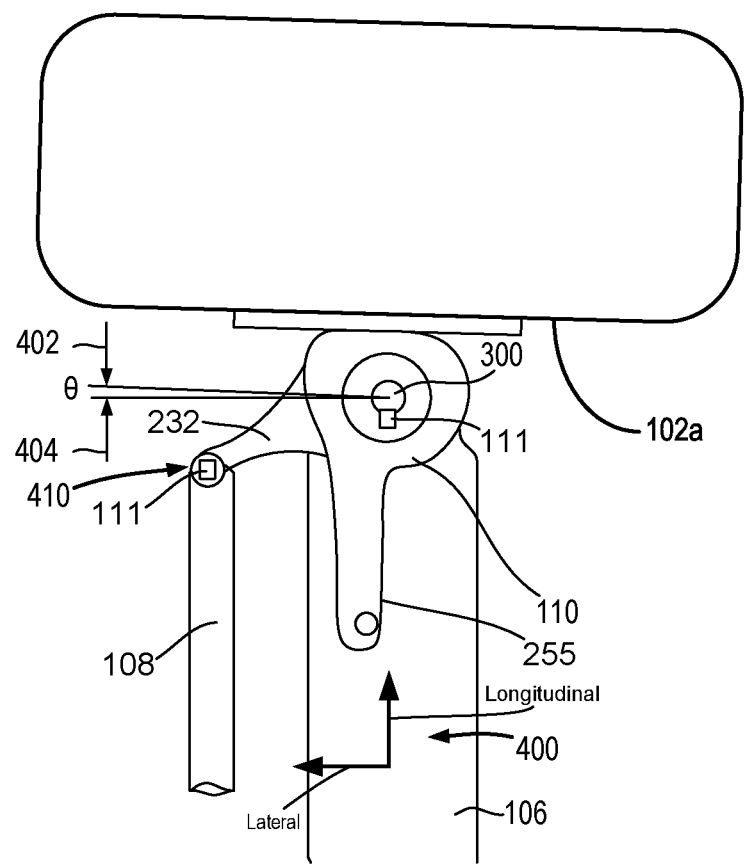
FIG. 4 shows an example angle between a kingpin and a beam axle.
Figure 5:
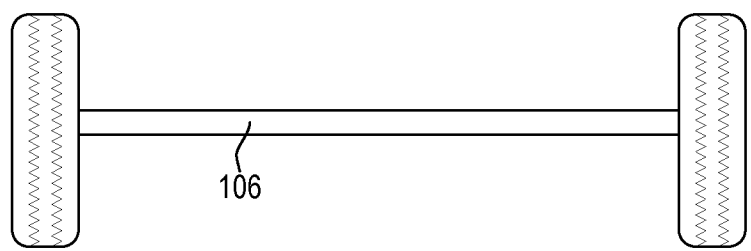
FIGS. 5 and 6 are examples of unloaded and loaded axles for illustrating the approach.
Figure 6:
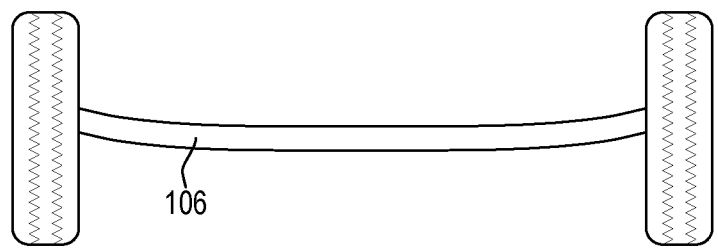
Figure 7:
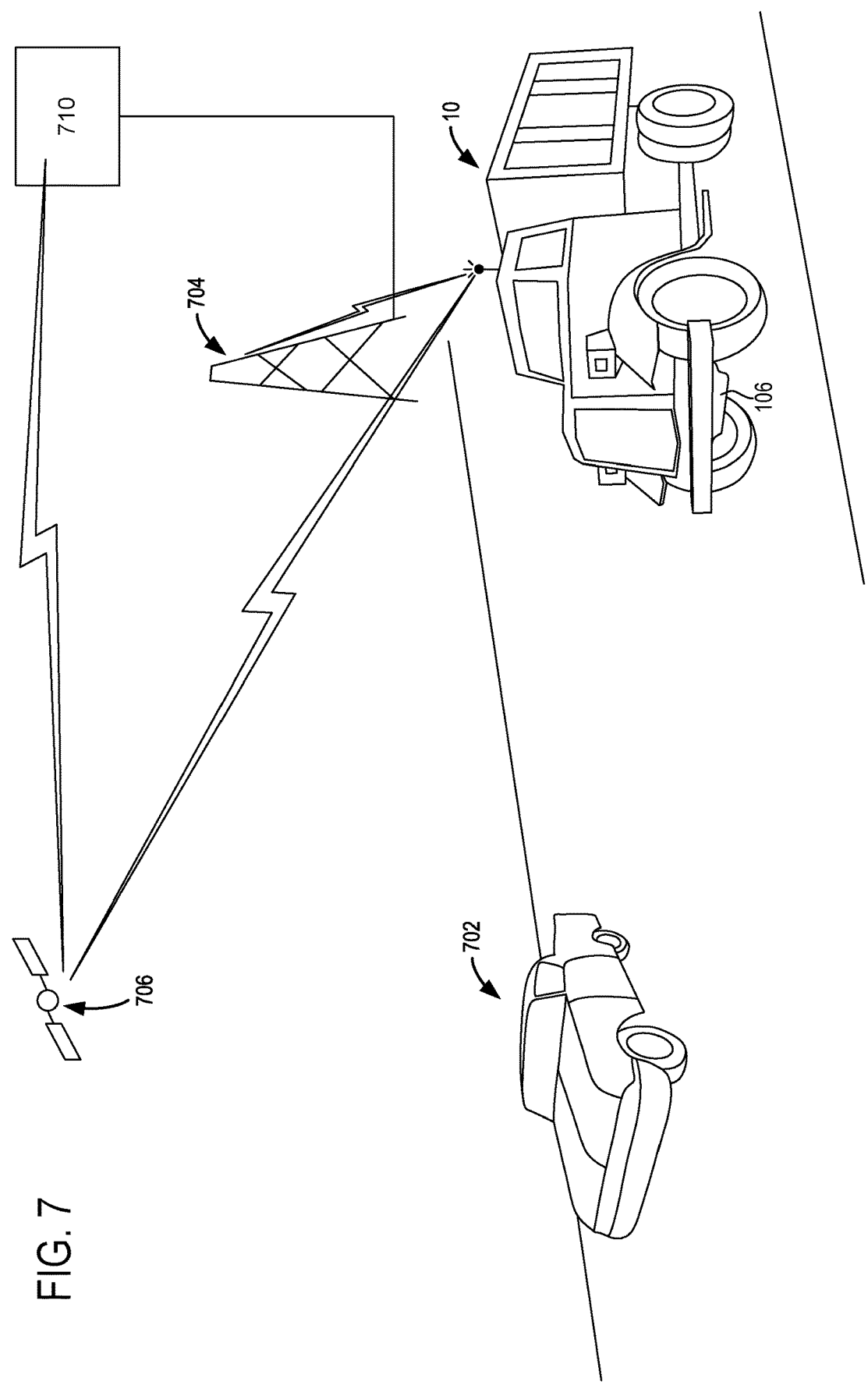
FIG. 7 is a schematic showing example destinations for axle load data.
Figure 8:
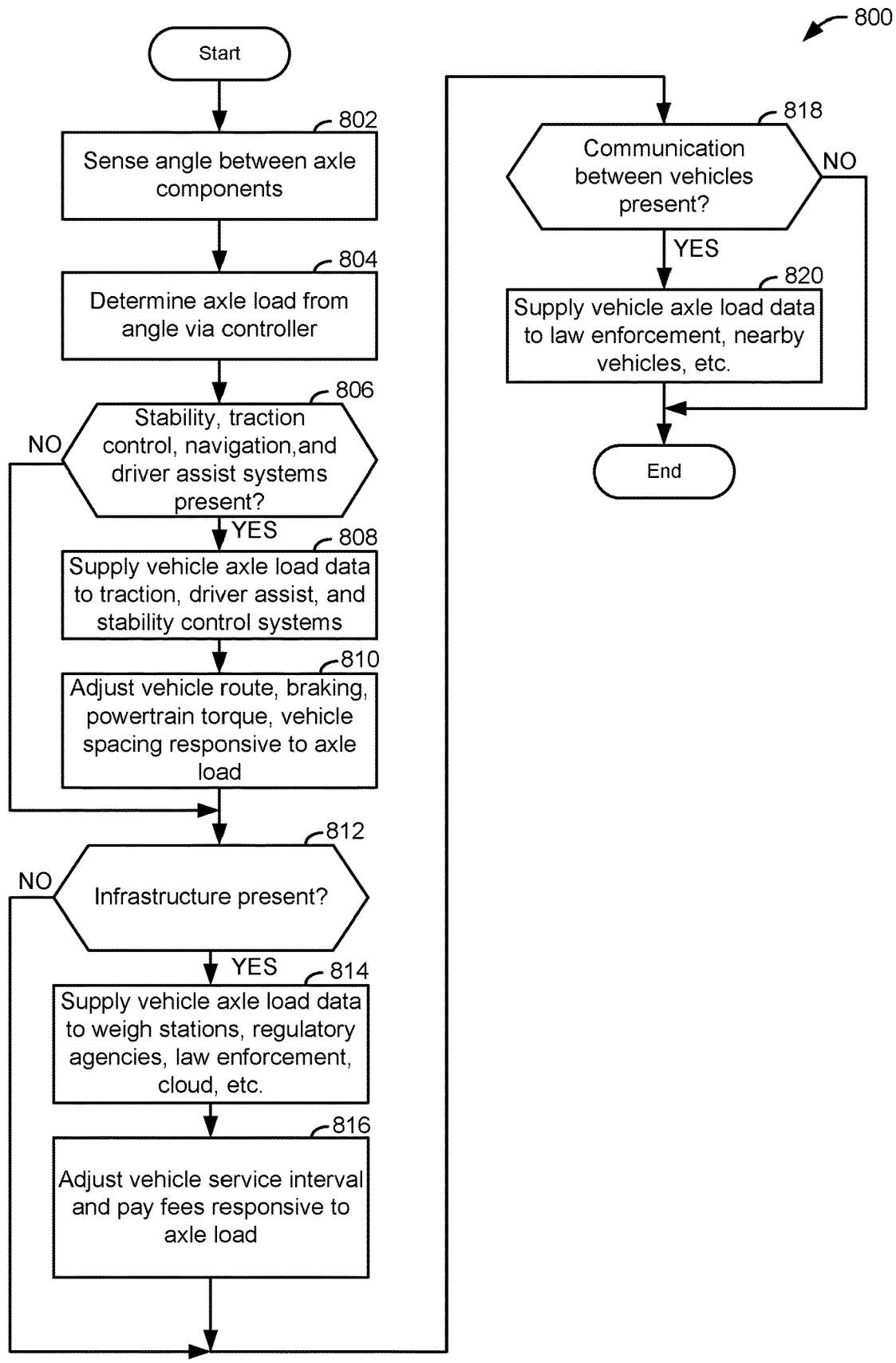
FIG. 8 is a flowchart of an example method for estimating axle load.
Figure 9:
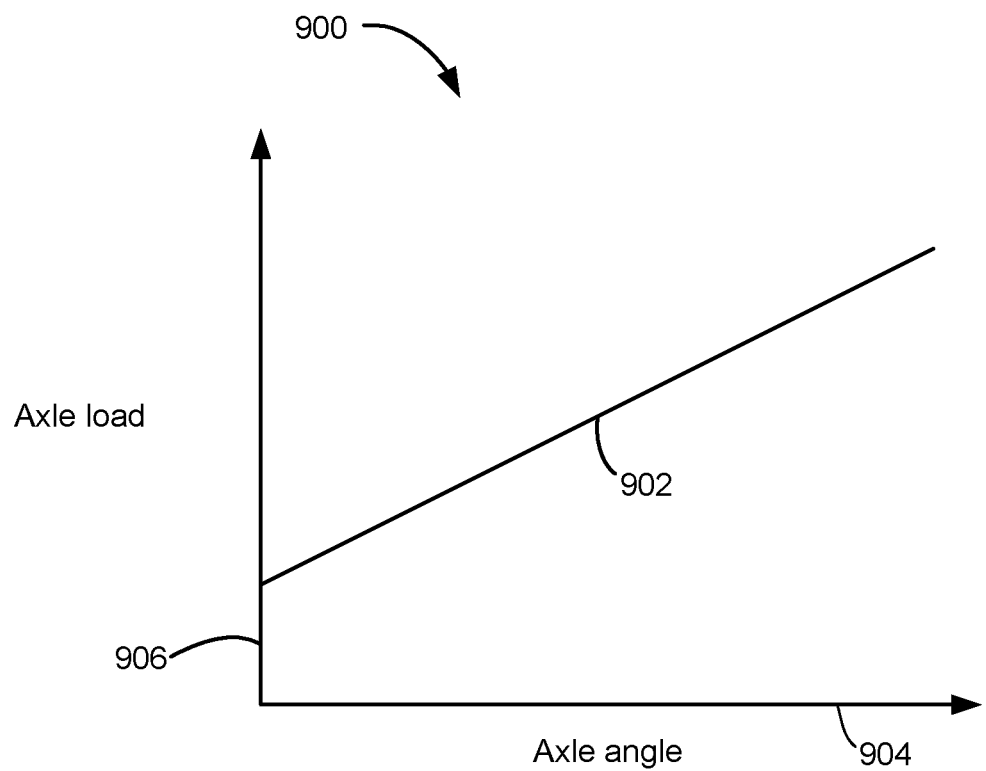
FIG. 9 is a plot of an example relationship between an axle angle measurement and axle load.

The following description relates to systems and methods for estimating axle load. The axle may be included in a vehicle that includes a propulsion source as shown in FIG. 1. The axle system may include knuckles, kingpins, a tie rod, and an axle. The knuckles may be of the type shown in FIG. 2. The kingpins may couple the knuckles to the axle as shown in FIG. 3. An angle sensor may sense an angle between two axle system components as shown in FIG. 4. FIGS. 5 and 6 show how one side of a trapezoid formed by the axle system may respond to axle load. The axle load data from the axle system may be communicated to other vehicle systems and external systems as shown in FIG. 7. A method for estimating axle load and communicating axle load is shown in FIG. 8. Finally, a relationship between an axle angle and axle load is shown in FIG. 9.

It is to be understood that the invention may assume various alternative orientations and step sequences, except where expressly specified to the contrary. It is also to be understood that the specific devices and processes illustrated in the attached drawings, and described in the specification are simply exemplary embodiments of the inventive concepts disclosed herein. Therefore, specific dimensions, directions or other physical characteristics relating to the various embodiments disclosed are not to be considered as limiting, unless expressly stated otherwise.

It is within the scope of this disclosure, and as a non-limiting example, that the method and system for determining axle load may be applied in automotive, off-road vehicle, all-terrain vehicle, construction, and structural applications. As a non-limiting example, the method and system for determining axle load disclosed herein may also be used in passenger vehicles, electric vehicles, hybrid vehicles, commercial vehicles, and autonomous vehicles.

For description purposes, the terms "engine" and "electric machine," and like terms, are used herein to indicate a power or propulsion source. The propulsion source may be fueled by energy sources including hydrocarbons and electricity.

As used herein, the term "controller" or "control unit" may be used interchangeably to indicate a vehicle's electronic subsystem for monitoring sensors and commanding actuators and other controllers of the vehicle or external to the vehicle.

For description purposes, a sensor is optionally configured to be a physical device, a virtual device, or a combination of the two. For example, a physical device may be configured to provide data to a controller to form a parameter used in the controller.

Disclosed herein is a system and method for determining vertical axle load on a vehicle based on a change in an angle between two components of an axle system. The system and method described herein may be used on any type of axle of a motor vehicle and it is not constrained to only axle systems that include axle components arranged in a trapezoid.

FIG. 1 illustrates an example vehicle driveline 199 included in vehicle 10. Mechanical connections are shown in FIG. 1 as solid lines and electrical connections are indicated as dashed lines.

Vehicle 10 includes a front side 120 and a rear side 121. Vehicle 10 includes front wheels 102 and rear wheels 103. In this example, vehicle 10 is configured as a two wheel drive vehicle; however, in other examples, vehicle 10 may be configured as a four wheel drive vehicle. Vehicle 10 includes a propulsion source 12 that may selectively provide propulsive effort to rear axle 190. Propulsion source 12 may be an internal combustion engine (e.g., spark ignited or diesel), or alternatively, propulsion source 12 may be an electric machine (e.g., a motor/generator), or a combination thereof. Propulsion source 12 is shown mechanically coupled to gearbox 14, and gearbox 14 is mechanically coupled to rear axle 190. Propulsion source 12 may provide mechanical power to gearbox 14. Rear axle 190 may receive mechanical power from gearbox 14 via driveshaft 170 so that mechanical power may be transmitted to rear wheels 103.

Rear axle 190 comprises two half shafts, including a first or right haft shaft 190a and a second or left half shaft 190b. The rear axle 190 may be an integrated axle that includes a differential gear set 191. Differential gear set 191 may be open when vehicle 10 is traveling on roads and negotiating curves so that right rear wheel 103a may rotate at a different speed than left rear wheel 103b. Differential gear set 191 allows vehicle 10 to turn without dragging right rear wheel 103a or left rear wheel 103b.

Front axle system 104 includes a right knuckle 110 on its right side, a left knuckle 112 on its left side, beam axle 106, tie rod 108, right kingpin 116, and left kingpin 115. The front axle system is configured in a shape of a trapezoid where the tie rod 108 and the beam axle 106 are parallel sides of the trapezoid and where right knuckle 112 and left knuckle 112 form the other two sides of the trapezoid. The arrangement of the axle system may influence the vehicle's toe angle shown here as angle α between arrows 114a and 114b. The toe angle is an angle that a wheel makes with the longitudinal axis of the vehicle. In this example, the angle α is a toe in angle when the wheel is pointed in the direction of vector 114c.

Vehicle 10 includes controller 144 and controller 144 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). Controller 144 may receive signals from sensors 154 (including axle angle sensors) and provide control signal outputs to actuators 156. Sensors 154 may include but are not limited to angle sensors 111. Actuators 156 may include but are not limited to propulsion source torque actuators (e.g., throttles, inverters, fuel injectors, etc.), and transceiver 161. Controller 144 may communicate with dash board 130, propulsion source 12, front axle 104, external controllers, external servers, and other controllers where present. In one example, controller 144 may communicate with braking controller 162, stability controller 164, and driver assist/automatic driver controller 166 via communication network 163 (e.g., a controller area network). Braking controller 162 and stability controller 164 may selectively apply and release friction brakes 167 to slow vehicle 10 or improve stability of vehicle 10. Driver assist/automatic driver controller 166 may selectively command torque from propulsion source 12 and vehicle braking via commanding vehicle braking controller 162.

Vehicle propulsion system may also include a dashboard 130 that an operator of the vehicle may interact with. Dashboard 130 may include an interactive navigation system 134 that generates and displays trip routes responsive to user input. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller 144. As such, in some examples, the vehicle operator may communicate via display system 132 with an internet site or software application (app) and controller 144. Dashboard 130 and devices included therein may be supplied with electrical power via battery 139. Battery 139 may also supply power to controller 144 and a starter motor (not shown) for propulsion source 12.

Dashboard 130 may further include an operator interface 136 via which the vehicle operator may adjust the operating status of the vehicle. Specifically, the operator interface 136 may be configured to initiate and/or terminate operation of the vehicle driveline (e.g., propulsion source 12) based on an operator input. Various examples of the operator interface 136 may include interfaces that require a physical apparatus, such as an active key, that may be inserted into the operator interface 136 to activate the propulsion source 12 and to turn on the vehicle 10, or may be removed to shut down the propulsion source 12 and to turn off the vehicle. Other examples may include a passive key that is communicatively coupled to the operator interface 136. The passive key may be configured as an electronic key fob or a smart key that does not have to be inserted or removed from the interface 136 to operate the propulsion source 12. Still other examples may additionally or optionally use a start/stop button that is manually pressed by the operator to start or shut down the propulsion source 12. Spatial orientation of vehicle 10 and vehicle axis are indicated via axes 175.

Figure 2:
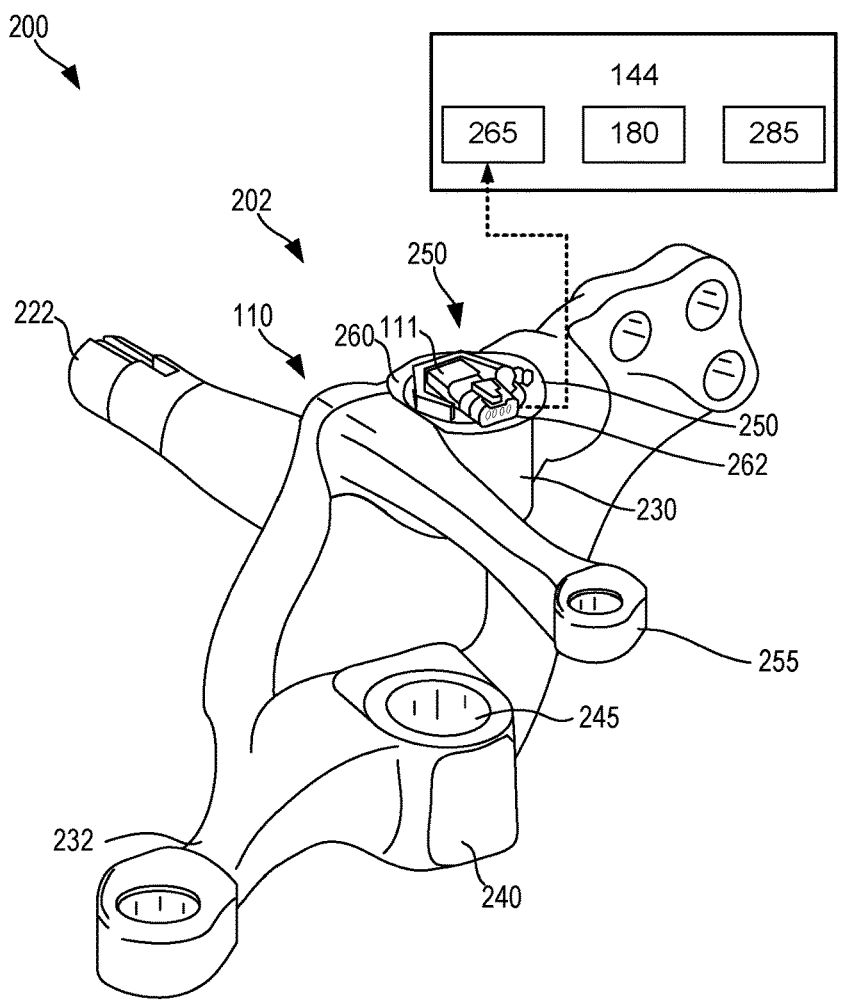
FIG. 2 shows an example knuckle for an axle assembly.

Turning now to FIG. 2, a schematic perspective view of a system 200 for estimating vehicle axle load is shown. The system 200 includes a wheel end assembly 202 in electric communication with controller 144 as shown in FIG. 1. Even though a steer axle wheel end assembly is shown, it is to be appreciated that the disclosure may be applied to a drive axle wheel end assembly, a non-drive axle wheel assembly, and/or a trailer axle wheel assembly.

The wheel end assembly 202 includes a right knuckle 110 disposed adjacent to an outboard end of steer beam axle 106 (FIG. 1). The right knuckle 110 incudes a spindle 222 extending therefrom in a direction generally parallel to a longitudinal axis of the steer beam axle 106. In one example, spindle 222 is formed unitary with right knuckle 110. The spindle 222 may be a non-rotating member of wheel end assembly 202.

The right knuckle 110 may include a tie rod arm 232. The tie rod arm 232 may be unitary with right knuckle 110. In other examples, the tie rod arm 232 may be a separable component of the wheel end assembly 202, and the tie rod arms 232 may form a portion of the trapezoid that is formed via tie rod 108, beam axle 106, and tie rod arms 232, which may be coupled to right 110 and left 112 knuckles. Right knuckle 110 may also include a steering arm 255, which may be coupled to steering linkage (not shown).

The right knuckle 110 has an upper kingpin boss 230 and a lower kingpin boss 240. The upper kingpin boss 230 defines an upper kingpin (not shown) extending there through and the lower kingpin boss 240 defines a lower kingpin bore 245 extending there through. The upper kingpin bore 235 and the lower kingpin bore 245 are configured to receive a kingpin 300 as shown in FIG. 3.

The knuckle cap assembly 250 includes a mounting portion 260 operably configured to enable sensor 111, such as an angle sensor, to be connected thereto. The knuckle cap assembly 250 may also include a connector 262 to electrically couple sensor 111 with the controller 144. The connector 262 may be disposed proximate to the sensor 111 on the knuckle cap assembly 250. In an example, the connector 262 may couple sensor 111 with a computing device, such as a hand held device (not shown) so that the measurements of sensor 111 may be viewed. In another example, the connector 262 may couple sensor 111 with an indicator light (not shown), wherein the indicator light may be programmed to emit light when sensor 111 detects a predetermined value associated with a toe angle change in the wheel end assembly 202. In yet another example, the connector 262 may couple sensor 111 with a controller area network (CAN) bus (e.g., 163 in FIG. 1).

The controller 144 may be configured to receive and record data measurements from the vehicle's internal systems and sensors, including sensor 111, via one or more databases. The data measurements obtained from sensor 111 may be applied to measure the change in the toe angle of the wheel end assembly 200 on the beam axle 106.

The controller 144 may average data measurements obtained from sensor 111 for improve accuracy and to reduce redundancy in the case of degradation of sensor 111. Further, controller 144 may combine angle measurements from two sensors 111 to determine a toe angle as described further herein.

In some examples, controller 144 may display data to the vehicle operator via display 132 shown in FIG. 1. Specifically, the data may notify the vehicle operator of the axle load and/or vehicle weight.

The controller 144 includes an input signal processing module 265, which may be a hardware and/or software routines that filters, amplify, and manipulates data input to the controller 144 from sensor 111. Controller 144 may also include a control module 280 and an output signal processing module 285. The control module 280 may be comprised of software configured to sample output of sensors 111 and to convert data from sensors 111 into axle load data values. The output signal processing module 285 may be comprised of software that communicates wheel angle and/or axle load data to other controllers (e.g., 162, 164, and 166) included with vehicle 10 as well as external controllers and servers as shown in FIG. 7. In some examples, output from sensor 111 may be an analog signal, a digital signal, or a pulse width signal.

The left knuckle 112 shown in FIG. 1 may be configured similarly to right knuckle 111. Further, a sensor 111 of the left knuckle 112 may communicate with controller 144 in a same way as a sensor 111 of right knuckle 111 communicates with controller 144.

Referring now to FIG. 3, a cross-section of right knuckle 110 and a cross-section of a portion of beam axle 106 is shown. In one example, beam axle 106 is coupled to right knuckle 110 via kingpin 300. Kingpin 300 may rotate with right knuckle 110 as right knuckle 110 rotates about beam axle 106. In addition, steering arm 255, spindle 222, upper kingpin boss 230, and lower kingpin boss 240 may rotate as part of right knuckle 110 about beam axle 106. Sensor 111 may sense a position of kingpin 300 and/or right knuckle 110 relative to a position of beam axle 106. Left knuckle 112 may be configured in a similar way.

In some examples, sensor 111 is a gyroscopic sensor, an angular rate sensor, a Hall-effect sensor, an inductive sensor, a resistive sensor, an optical sensor, a linear variable differential transformer (LVDT), an inclinometer sensor, or other known type of sensor. In examples where sensor 111 is a Hall-effect sensor, the sensor 111 is configured to measure angular, axial, and radial position of the wheel end assembly 200 as shown in FIG. 2 relative to a position of the beam axle 106. The Hall-effect sensor may be disposed on the right knuckle 110 inboard of spindle 222 in order to measure the position of right knuckle 110 relative to a position of the beam axle 106. In examples where sensor 111 is an inductive sensor, sensor 111 may be configured to use changes in a magnetic field generated thereby to determine a position of kingpin 300 relative to a position of beam axle 106. In examples where sensor 111 is a resistive sensor, an output voltage of the resistive sensor may be determined by a change in resistance of the resistive sensor, which may be dependent on the angular position of kingpin 300. In examples where sensor 111 is an optical sensor, sensor 111 may scan slots or protrusions in the end of kingpin 300 (not shown) adjacent to the sensor 111. The number of slots scanned by the sensor 111 may be indicative of a position of kingpin 300 relative to a position of beam axle 106. In examples where sensor 111 is an LVDT sensor, a first portion of the LVDT sensor may be coupled to a surface of right knuckle 110 and a second portion of the LVDT sensor may be coupled to beam axle 106. An algorithm may be applied to determine the axial and radial position of right knuckle 110 using linear displacement of the LVDT sensor 111. In examples where the sensor 111 is a inclinometer, sensor 111 may be configured to sense a tilt elevation of right knuckle 110. An algorithm may be applied to determine the axial and radial position of the right knuckle 110 sensed via sensor 111. The left knuckle 112 and its associated sensor 111 may operate in a similar way. It should be noted that although FIGS. 1-3 show a knuckle and beam axle configuration, the system and methods described herein may be applied to different axle and wheel end assemblies.

Referring now to FIG. 4, a schematic view of an example angle between a kingpin and a beam axle is shown. Longitudinal and lateral axes of beam axle 106 are indicated at 400. The longitudinal axis of beam axle 106 may be perpendicular to the longitudinal axis of vehicle 10 shown in FIG. 1. In this figure, a plan view of right knuckle 110 and beam axle 106 is shown. The angle sensor 111 is shown in two exemplary locations. A first location of angle sensor 111 may be proximate to kingpin 300, and in one example, angle sensor 111 may be positioned above kingpin 300. Sensor 111 may sense an angle between beam axle 106 and kingpin 300 when sensor 111 is located in the first position. Alternatively, sensor 111 may sense an angle between beam axle 106 and right knuckle 110 when sensor 111 is located in the first position. A second location of angle sensor 111 may be at or near ball joint 410 where tie rod 108 is coupled to tie rod arm 232. Sensor 111 may sense an angle between tie rod 108 and tie rod arm 232 when sensor 111 is located in the second position.

In this figure, the angle measured by sensor 111 when sensor 111 is located in the first position is indicated as angle e between arrows 402 and 404. The angle Θ may be equivalent or proportional to the toe angle α shown in FIG. 1. The angle Θ may change as loads are applied to and removed from beam axle and right front wheel 102a.

Referring now to FIGS. 5 and 6, graphical representations of a concept of the present invention are shown. In particular, FIG. 5 shows an example representation of beam axle 106 when beam axle 106 is not loaded. FIG. 6 shows a second example representation of beam axle 106 when beam axle 106 is loaded. FIG. 5 shows that beam axle 106 may deflect very little when it is unloaded. Conversely, FIG. 6 shows that beam axle 106 may deflect such that it may bend and cause right front wheel 102a and left front wheel 102b to move closer together. The tie rod length may remain unchanged when the load is applied to beam axle 106 and when the load is not applied to beam axle 106. Instead, an angle between beam axle 106 and right knuckle 110 may change when weight is added to or removed from beam axle 106. In other words, the angles between components of the axle system may change when weight is added to or removed from the beam axle 106, but only the length of beam axle 106 may be changed. Accordingly, the angles between the various components of the axle system may be indicative of load that is applied to the beam axle.

Referring now to FIG. 7, a schematic view of devices and systems that may utilize axle load data is shown. In this example, vehicle 10 is a truck that is traveling on a road. Vehicle 10 includes beam axle 106 and other components of the axle system shown in FIGS. 1-4 (not shown). The load of vehicle 10 as determined via output of an angle sensor (not shown) may be utilized via vehicle 10 as well as by other vehicles 702 and external servers 710 (e.g., cloud servers and computers). Vehicle 10 may broadcast axle load data and vehicle weight data as determined from beam axle 106 and sensor 111 shown in FIG. 1 to other vehicles 702 and external servers 710. In one example, vehicle 10 may broadcast axle load and vehicle weight data to satellite 706. Satellite 706 may in turn broadcast the data from vehicle 10 to external servers 710. In some examples, vehicle 10 may broadcast vehicle data including axle load and vehicle weight to infrastructure 704. Data from vehicle 10 may be transmitted from infrastructure 704 to other infrastructure and/or external servers 710.

The system of FIGS. 1-7 provides for a system for estimating axle load of a vehicle, comprising: an axle system including an axle, a first knuckle, a second knuckle, a first kingpin, a second kingpin, and a tie rod; an angle sensor; and a controller including executable instructions stored in non-transitory memory that cause the controller to estimate an axle load in response to output of the angle sensor. The system further comprises additional instructions to communicate the axle load to a second controller. The system further comprises additional instructions to communicate the axle load a device off board the vehicle. The system includes where the device is an external server, a second vehicle, or infrastructure. The system includes where the angle sensor is arranged to sense an angle between the first kingpin and the first knuckle, sense an angle between the second kingpin and the second knuckle, sense an angle between the axle and the first knuckle, sense an angle between the axle and the second knuckle, sense an angle between the tie rod and the first knuckle, or sense an angle between the tie rod and the second knuckle. The system includes where the axle is a steering axle. The system further comprises a second angle sensor.

Referring now to FIG. 8, an example method for estimating axle load and applying axle load is shown. At least portions of method FIG. 8 may be performed via a controller in cooperation with the system of FIGS. 1-7. In some examples, at least portions of method FIG. 8 may be incorporated as executable instructions stored in non-transitory memory of a controller. In addition, some portions of the method may be performed via the controller transforming operating states of devices and actuators in the physical world. The method of FIG. 8 may be applied to front and rear axles of a vehicle. The method of FIG. 8 may be executed while a vehicle is stationary or traveling on a road.

At 802, method 800 senses one or more angles between axle components. Method 800 may determine an angle between a beam axle and a knuckle, an angle between the beam axle and a kingpin, an angle between a tie rod and a tie rod arm, and/or an angle between other axle components for a right side of an axle. Method 800 may determine similar angles for a left side of the axle too. Method 800 may determine the angles via sensors arranged as described and shown in FIGS. 107. Additionally, method 800 may determine angles for right and left sides of both front and rear axles.

In some examples, method 800 may determine the angles when a set or group of specific vehicle operating conditions is met to improve the accuracy of axle load estimates. For example, method 800 may begin determining angles between axle system components in response to the vehicle being stationary and when the vehicle's front wheels are pointed straight ahead. In other examples, method 800 may begin determining angles between axle system components in response to the vehicle traveling on a road above a threshold vehicle speed with the vehicle's front wheels pointed straight ahead. Method 800 proceeds to 804.

At 804, method 800 determines axle load data from the one or more axle angles determined at 802. In one example, method 800 receives angle data from two angle sensors and determines an angle from the axle's right angle sensor and an angle from the axle's left angle sensor. The angle from the axle's front right angle sensor is subtracted from the angle from the axle's front left angle sensor to determine the vehicle's toe angle. The vehicle's toe angle is applied to reference a table or function that outputs a vehicle axle load. FIG. 9 shows a plot of one example of a relationship between toe angle and axle load that may be output from the table or function. In other examples, method 800 may estimate the vehicle toe angle according to output of a single angle sensor (e.g., left or right angle sensor). Method 800 may estimate the axle load from the toe angle that is based on one axle angle measurement. Method 800 may determine a rear axle load in a similar way. Method 800 proceeds to 806.

At 806, method 800 judges if stability control systems, traction control systems, navigation systems and driver assist systems are present. If so, the answer is yes and method 800 proceeds to 808. Otherwise, the answer is no and method 800 proceeds to 810.

At 808, method 800 may transmit and supply front and/or rear axle loads to the various controllers of the systems. In one example, the front and rear axle loads may be transmitted via a CAN. Method 800 proceeds to 810.

At 810, the stability control system and the traction control system may use the front and rear axle loads to determine normal loads on the vehicle's wheels. Braking torques for the vehicle's friction brakes may be adjusted based on the normal loads on the vehicle's wheels that have been determined based on the front and rear axle loads. In addition, propulsion source torques (e.g., engine torque output and/or electric machine torque output) may be adjusted based on the normal loads on the vehicle's wheels to provide desired levels of wheel torque.

The navigation system may also adjust a displayed travel route in response to the axle loads provided at 810. For example, the navigation system may include road weight limit data and the navigation system may adjust a travel route to a destination such that the vehicle does not travel on roads that have weight limits that are less than the estimated vehicle weight that is based on the vehicle's axle loads. In this way, the vehicle may avoid roads that may not have a capacity to carry the vehicle's weight.

The axle loads and vehicle weight as determined from axle loads may be supplied to driver assistants and autonomous driver controls for adjusting vehicle driving control parameters at 810. For example, a driver assistant may increase or decrease a vehicle stopping buffer distance that is allocated between the present vehicle and vehicles that are directly in front of the present vehicle. In particular, the driver assistant or autonomous driver may reduce or increase vehicle speed buffer distance in response to the vehicle axle loads. Vehicle operation may be adjusted in response to vehicles entering the vehicle stopping buffer distance. Specifically, a vehicle's speed may be reduced if a second vehicle enters the vehicle speed buffer distance. Similarly, the vehicle's speed may be increased if the second vehicle exits the vehicle speed buffer distance. Thus, if a vehicle stopping buffer distance is 500 meters when an axle load is 2000 kilograms, the vehicle stopping buffer distance may be increased to 750 meters when the axle load is increased to 2500 kilograms so that the vehicle may have a better possibility of stopping before reaching a vehicle that enters the vehicle stopping buffer distance and stops. The autonomous driver may make similar driving parameter adjustments responsive to axle loads. Method 800 proceeds to 812.

At 812, method 800 judges if infrastructure is present to receive axle load data. If so, the answer is yes and method 800 proceeds to 814. Otherwise, the answer is no and method 800 proceeds to 818. Infrastructure may include but is not limited to satellites, cellular communication towers, optical sensors, weigh station communication systems, traffic control systems, bridge control systems, regulatory agencies, law enforcement stations, weigh stations, traffic routing systems, computers, cloud servers, and other types of infrastructure.

At 814, method 800 may transmit and supply front and/or rear axle loads to the infrastructure. In one example, the front and rear axle loads may be transmitted via a satellites or cellular communication networks. Method 800 proceeds to 816.

At 816, infrastructure systems may perform tasks responsive to the axle load data. For example, regulatory agencies may issue permits, tolls, and fines in response to the axle load data. Further, infrastructure systems may issue payments and invoices in response to axle load data. Further still, vehicle maintenance tracking systems may schedule service for the vehicle (e.g., oil changes, front end alignments, etc.) responsive to axle load data received from the vehicle. Method 800 proceeds to 818.

At 818, method 800 judges if vehicle to vehicle communication is present to transmit axle load data. If so, the answer is yes and method 800 proceeds to 820. Otherwise, the answer is no and method 800 proceeds to exit.

At 820, method 800 may transmit vehicle axle load data to other vehicles including but not limited to law enforcement vehicles, nearby vehicles, and emergency vehicles. The vehicle's that receive the axle load information may report the axle load data to vehicle occupants and adjust vehicle driving parameters (e.g., vehicle stopping buffer distances) in response to the axle load data. Method 800 proceeds to exit.

In this way, axle loads of a vehicle may be determined and utilized to improve vehicle travel. Further, the vehicle axle load may help to mechanize fee collections and generate invoices.

Thus, the method of FIG. 8 provides for a method for estimating axle load of a vehicle, comprising: estimating axle load of a vehicle in response to one or more angles between two or more axle system components via a controller; and adjusting operation of a system of the vehicle in response to the estimated axle load of the vehicle. The method includes where the system is a braking system. The method includes where the system is a propulsion system. The method includes where the system is a navigation system. The method further comprises communicating the estimated axle load to a system that is external to the vehicle. The method includes where the two or more axle components include a knuckle and a kingpin. The method includes where the two or more axle components include a knuckle and a tie rod.

The method of FIG. 8 also provides for a method for estimating axle load of a vehicle, comprising: estimating axle load of a vehicle in response to one or more angles between two or more axle system components via a controller; and communicating the axle load estimate from the controller to a device. The method includes where the device is a second controller within the vehicle. The method includes where the second controller is a propulsion controller. The method includes where the second controller is a navigation controller. The method includes where the device is an external controller or server. The method includes where the external controller is within a second vehicle.

Referring now to FIG. 9, an example relationship for estimating load of an axle is shown. In this example, the vehicle toe angle versus axle load relationship illustrated by line 902 is linear, but in other examples it may be non-linear.

Relationship 900 includes a horizontal axis 904 and a vertical axis 906. Horizontal axis 904 represent a toe angle of an axle and vertical axis 906 represents an axle load that is a function of toe angle. Relationship 900 outputs an axle load when it is indexed or referenced via a toe angle as determined via an angle sensor. The toe angle increases from the left side of the plot to the right side of the plot. The axle load increases in the direction of the vertical axis arrow.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for estimating axle load of a vehicle, comprising:
   an axle system including two or more axle system components, where the two or more axle system components include a knuckle and a kingpin;
   an angle sensor positioned proximate to one or more of the axle system components; and
   a controller including executable instructions stored in non-transitory memory that cause the controller to estimate axle load of a vehicle in response to one or more angles between the two or more of the axle system components, and adjust operation of a system of the vehicle in response to the estimated axle load of the vehicle.

2. The system of claim 1, where the system is a braking system.

3. The system of claim 1, where the system is a propulsion system.

4. The system of claim 1, where the system is a navigation system.

5. The system of claim 1, where the instructions further includes instructions to communicate the estimated axle load to a system that is external to the vehicle.

6. A system for estimating axle load of a vehicle, comprising:
   an axle system including two or more axle system components axle system components, where the two or more axle system components include a knuckle and a tie rod;
   an angle sensor positioned to sense an angle between the tie rod and the knuckle; and
   a controller including executable instructions stored in non-transitory memory that cause the controller to estimate axle load of a vehicle in response to one or more angles between the two or more of the axle system components, and adjust operation of a system of the vehicle in response to the estimated axle load of the vehicle.

7. The system of claim 6, where the system is a braking system.

8. The system of claim 6, where the system is a propulsion system.

9. The system of claim 6, where the system is a navigation system.

10. The system of claim 6, where the instructions further includes instructions to communicate the estimated axle load to a system that is external to the vehicle.

11. A system for estimating axle load of a vehicle, comprising:
    an axle system including an axle, a first knuckle, a second knuckle, a first kingpin, a second kingpin, and a tie rod;
    an angle sensor; and
    a controller including executable instructions stored in non-transitory memory that cause the controller to estimate an axle load in response to output of the angle sensor, where the angle sensor is arranged to sense an angle between the first kingpin and the first knuckle, sense an angle between the second kingpin and the second knuckle, sense an angle between the axle and the first knuckle, sense an angle between the axle and the second knuckle, sense an angle between the tie rod and the first knuckle, or sense an angle between the tie rod and the second knuckle.

12. The system of claim 11, further comprising additional instructions to communicate the axle load to a second controller.

13. The system of claim 11, further comprising additional instructions to communicate the axle load to a device off board the vehicle.

14. The system of claim 13, where the device is an external server, a second vehicle, or infrastructure.

15. The system of claim 11, where the axle is a steering axle.

16. The system of claim 11, further comprising a second angle sensor.

* * * * *